United States Patent
Swanson

[11] Patent Number: 6,036,003
[45] Date of Patent: *Mar. 14, 2000

[54] MODULAR ASSEMBLY MACHINE

[75] Inventor: Douglas L. Swanson, McKean, Pa.

[73] Assignee: Swanson Systems, Inc., Erie, Pa.

[ * ] Notice: This patent is subject to a terminal disclaimer.

[21] Appl. No.: 09/299,434

[22] Filed: Apr. 26, 1999

Related U.S. Application Data

[62] Division of application No. 08/874,749, Jun. 13, 1997, Pat. No. 5,904,242.

[51] Int. Cl.⁷ .................................................. B65G 21/06
[52] U.S. Cl. ........................................................ 198/860.2
[58] Field of Search ............................ 198/735.2, 860.1, 198/860.2, 861.1; 29/208

[56] References Cited

U.S. PATENT DOCUMENTS

| | | | |
|---|---|---|---|
| 3,039,597 | 6/1962 | Merchant | 29/208 |
| 3,065,530 | 11/1962 | Merchant | 29/428 |
| 3,143,792 | 8/1964 | Swanson et al. | 29/208 |
| 3,231,968 | 2/1966 | Swanson | 29/208 |
| 4,404,505 | 9/1983 | Swanson et al. | 318/561 |
| 5,022,909 | 6/1991 | Swanson | 65/278 |
| 5,125,140 | 6/1992 | Sticht | 198/860.2 X |
| 5,186,314 | 2/1993 | Clopton | 198/860.2 |
| 5,361,894 | 11/1994 | Solcz | 198/860.1 |
| 5,904,242 | 5/1999 | Swanson | 198/860.2 |

*Primary Examiner*—James R. Bidwell
*Attorney, Agent, or Firm*—Brinks Hofer Gilson & Lione

[57] ABSTRACT

A reconfigurable assembly machine includes a rigid platform, a plurality of identical modular supports which are arranged in an aligned, adjacent, longitudinally extending configuration, a plurality of links which form a continuous, recirculating chain and receive product fixtures, a chain drive module and idle module disposed at opposite ends of the longitudinally extending configuration of modular supports for translating the plurality of links and product fixtures and a plurality of work stations disposed on respective ones of the plurality of modular supports. The chain drive module also provides drive energy to the work stations in order that fabrication and assembly steps performed by such work stations occur in proper timed relationship to other steps and to movement of the chain and product fixtures. A particular modular support and associated work station may be readily installed and assembled with or removed from the assembly machine in order to add or remove a certain manufacturing function or assembly task.

20 Claims, 5 Drawing Sheets

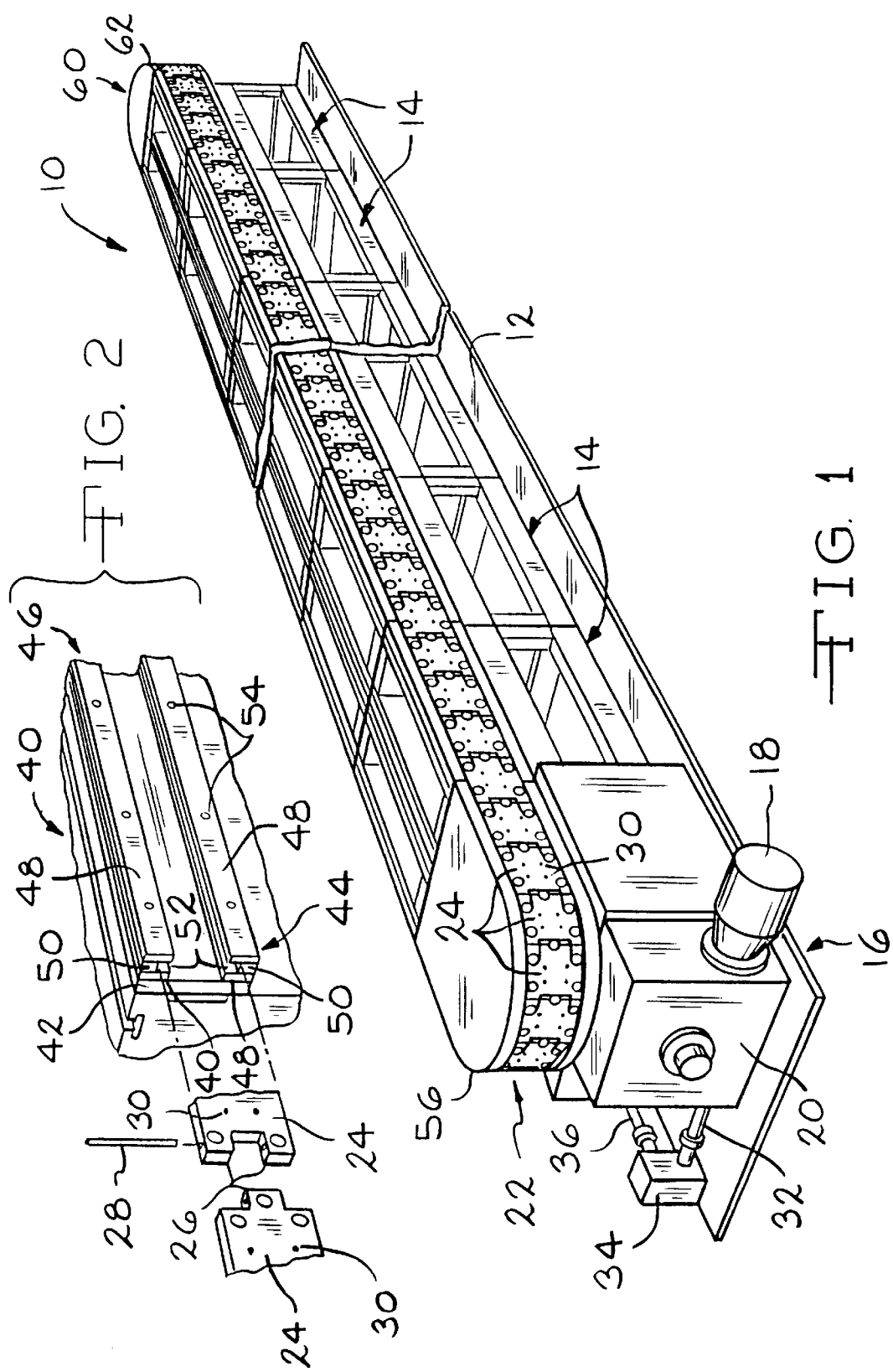

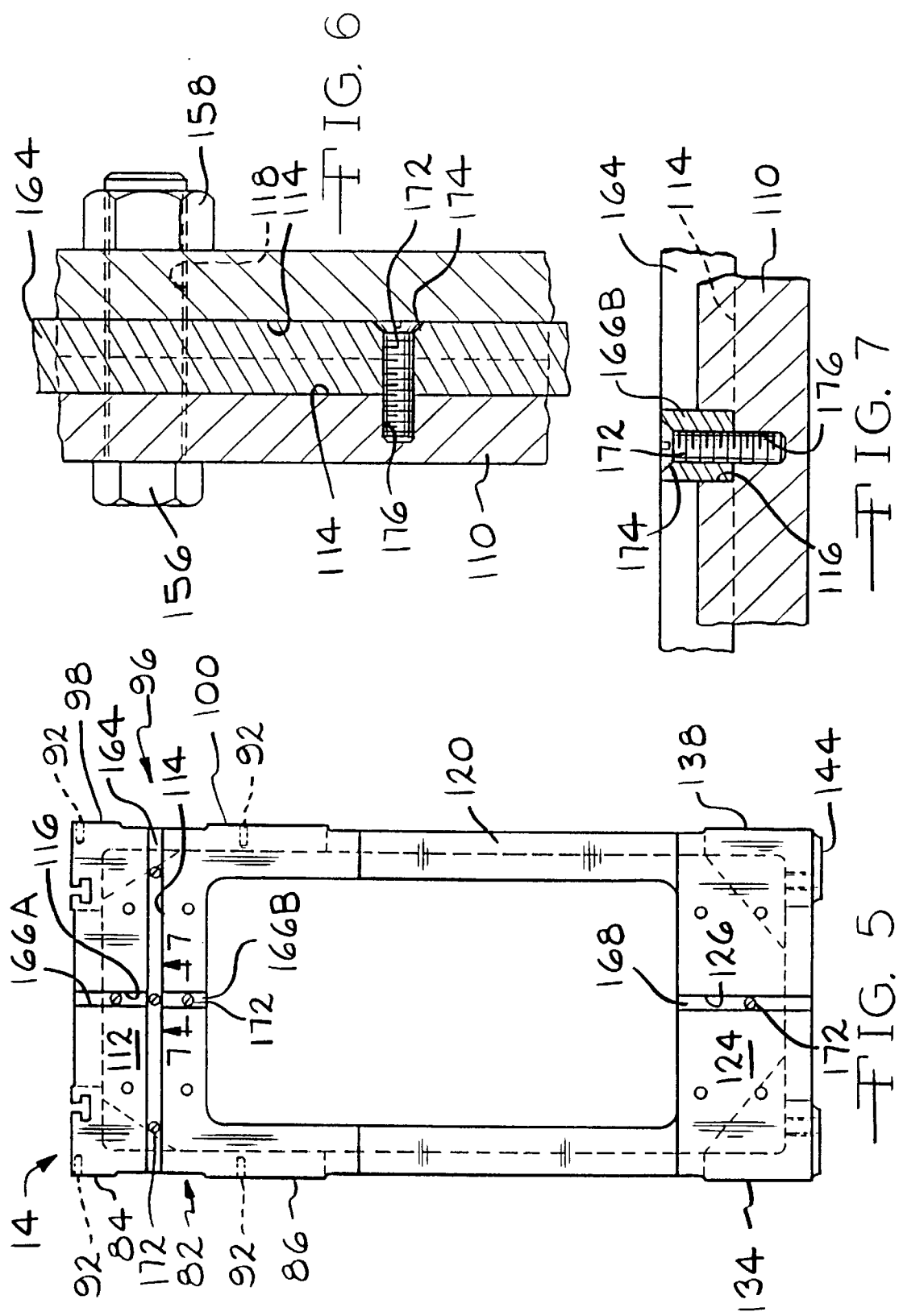

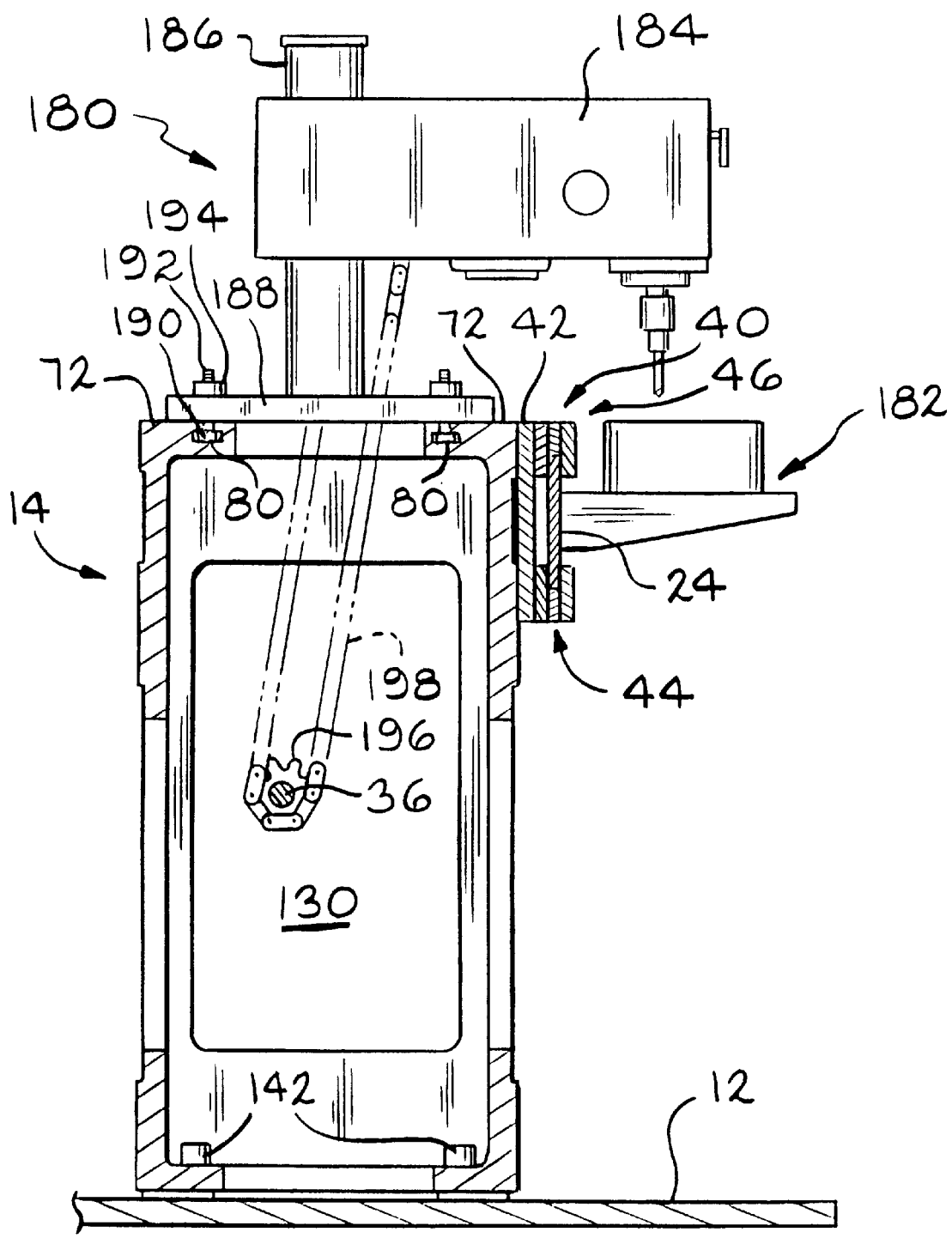

MODULAR ASSEMBLY MACHINE

CROSS-REFERENCE TO CO-PENDING APPLICATION

This is a division of patent application Ser. No. 08/874,749, filed Jun. 13, 1997, now U.S. Pat. No. 5,904,242 granted May 18, 1999.

BACKGROUND OF THE INVENTION

The invention relates generally to linear assembly machines having multiple work stations and product fixtures and more specifically to a reconfigurable linear assembly machine having a plurality of identical support modules which may be selectively installed or removed at locations in the assembly machine to add or remove certain manufacturing processes and assembly steps.

Automated assembly machines may be categorized according to the fundamental physical layout of the machine that is, whether it is rotary or linear. In a typical linear machine, a recirculating belt or chain carries a plurality of product fixtures sequentially and linearly along a plurality of adjacent, stationary work stations. In a rotary machine, the product fixtures are disposed upon a circular, typically horizontal, plate which rotates about a center, vertical axis and presents the fixtures to a plurality of stationary work stations. Numerous considerations such as the number of work stations, the number of product fixtures, the ratio between these two numbers, work station cycle times and other factors influence the decision to select one or the other of these types of machines to fabricate a given product.

A second mode of categorization is temporal rather than physical and relates to whether the product fixtures move simultaneously or independently. In a synchronous machine such as either the linear or rotary assembly machines described above, all product fixtures, since they are coupled together or to a common support, move together. In an asynchronous machine, the product fixtures are independent of one another and may therefore independently circulate between work stations or independently remain stationery at a work station as necessary.

Linear or straight line machines are illustrated in commonly owned U.S. Pat. Nos. 3,039,597 and 4,404,505. A rotary assembly machine is disclosed in commonly owned U.S. Pat. No. 3,143,792.

While these machines provide exceptional control of the manufacturing process by virtue of their repeatability and their close operating tolerances, one difficulty shared by such machines, which is an outgrowth of their basic construction, is their dedication to a given manufacturing process. That is, a certain number of product fixtures and work stations necessary to produce a given product are relatively permanently arranged in such machines and are typically only broken down for repair or rebuilding. Clearly, during the period of repair or rebuilding of just a portion of such machine, the entire machine is unavailable for production. Furthermore, because of the unitary, dedicated construction of such machines, the ability to relatively quickly add or remove a certain process or tool fixture to add or delete a certain process step, is generally unavailable. Nonetheless, it has been found desirable in this general class of machines to have the flexibility of repair, substitution, addition and deletion. The present invention is directed to providing such flexibility in linear assembly machines.

SUMMARY OF THE INVENTION

A reconfigurable assembly machine includes a rigid platform, a plurality of identical modular supports which are arranged in an aligned, adjacent, longitudinally extending configuration, a track assembly secured to the periphery of the modular supports, a plurality of links which form a continuous, recirculating chain disposed in the track assembly and which receives product fixtures, a chain drive module and an idle module disposed at opposite ends of the longitudinally extending configuration of modular supports for facilitating continuous circulation of the chain and product fixtures and a plurality of work stations disposed on the plurality of modular supports.

The chain drive module also provides motive power to the work stations in order that fabrication and assembly steps performed by such work stations may occur in proper timed relationship to other steps and to movement of the chain links and product fixtures. A particular modular support and associated work station may be readily installed and assembled with or removed from the assembly machine in order to add or remove a certain manufacturing function or assembly task and repair or modify the work station.

It is therefore an object of the present invention to provide a flexible, i.e., reconfigurable assembly machine.

It is a further object of the present invention to provide a reconfigurable assembly machine having a plurality of identical modular supports with diverse work station equipment disposed thereon.

It is a still further object of the present invention to provide a reconfigurable assembly machine having a plurality of identical modules with diverse work station equipment disposed thereon which may be quickly assembled into or removed from the machine to reconfigure it for various manufacturing tasks.

It is a still further object of the present invention to provide a reconfigurable assembly machine which supplies rotary motion to a plurality of identical support modules and associated, diverse work station equipment.

It is a still further object of the present invention to provide a reconfigurable assembly machine which translates product fixtures and performs manufacturing and assembly operations in timed relationship to one another.

Further objects and advantages of the present invention will become apparent by reference to the following description of the preferred embodiment and appended drawings wherein like reference numbers refer to the same element, component or feature.

BRIEF DESCRIPTION OF THE DRAWINGS

FIG. 1 is a perspective view of a reconfigurable assembly machine according to the present invention;

FIG. 2 is a fragmentary perspective view of a chain track assembly for a reconfigurable assembly machine according to the present invention;

FIG. 5 is an end, elevational view of a modular support of a reconfigurable assembly machine according to the present invention;

FIG. 6 is a fragmentary, full sectional view of a modular support of a reconfigurable assembly machine according to the present invention taken along line 6—6 of FIG. 4;

FIG. 7 is a fragmentary, full sectional view of a modular support of a reconfigurable assembly machine according to the present invention taken along line 7—7 of FIG. 5; and FIG. 8 is a full, sectional view of a modular support and typical work station of a reconfigurable assembly machine according to the present invention.

DESCRIPTION OF THE PREFERRED EMBODIMENT

Figure 3:
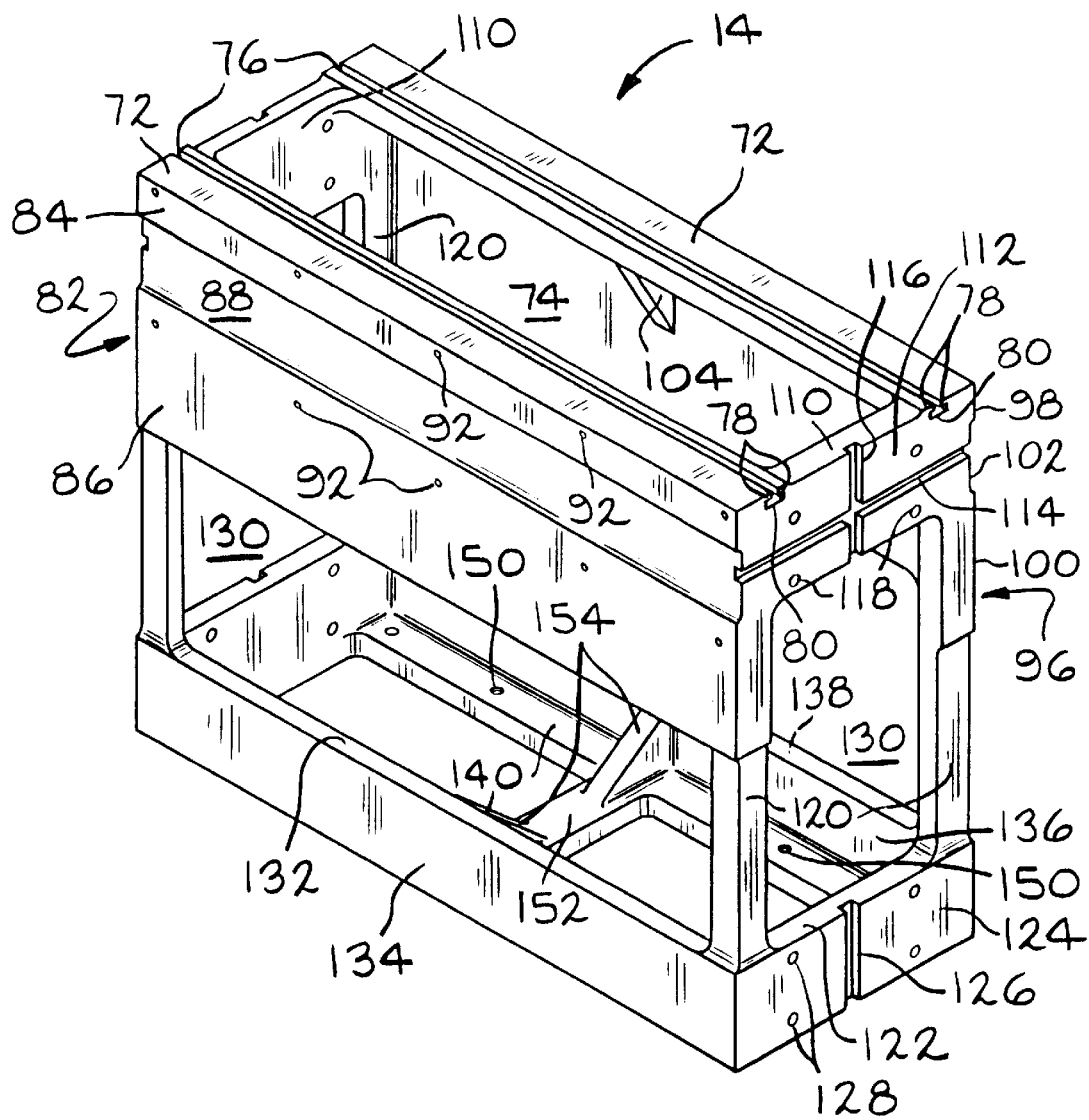
FIG. 3 is a perspective view of a modular support for a reconfigurable assembly machine according to the present invention.

Referring now to FIG. 1, a reconfigurable assembly machine according to the present invention is illustrated and generally designated by the reference number 10. If desired, the reconfigurable assembly machine 10 may be disposed upon a rectangular, planar, elongate foundation or mounting plate 12. The mounting plate 12 functions as a rigid and dimensionally stable foundation for the assembly machine 10 and may be a suitable material such as hot rolled steel having a width and length at least equal to the corresponding dimensions of the equipment to be placed thereon and preferably somewhat longer and significantly wider.

Juxtaposed along the length of the mounting plate 12 are a plurality of support modules 14. The support modules 14 may be arranged in either a single file configuration or paired in an adjacent, back-to-back configuration as illustrated in FIG. 1. At one end of the plurality of support modules 14 is a drive module 16 which preferably includes an electric motor 18 and an indexing or incrementing gear drive assembly 20. The incrementing gear drive assembly 20 converts the continuous, relatively high speed input from the electric motor 18 to an intermittent, incremental low speed output which drives a chain assembly 22. The chain assembly 22 comprises a plurality of interconnected flat plates or links 24 which circulate in an oval path along the upper portions of the support modules 14. The links 24 are pivotally or hingedly interconnected through the agency of interengaging or interleaved ears 26 and a pivot pin 28 in a structure which generally resembles a hinge. The links 24 preferably include a plurality of threaded apertures 30 arranged in an array which are suitable for the securement of various component and assembly fixtures and the like.

The drive module 16 also drives a shaft 32 which, through a right hand drive assembly 34 and an interconnected output shaft 36 provides rotary drive energy to assemblies disposed on various support modules 14 as will be more fully explained below.

As illustrated in FIG. 2, the links 24 of the chain assembly 22 traverse the side of the support modules 14 in a track assembly 40. The track assembly 40 includes a support plate 42, a lower rail assembly 44 and an inverted, upper rail assembly 46. Both the lower rail assembly 44 and the upper rail assembly 46 are identical but for the fact that one is arranged in an inverted fashion relative to the other. Accordingly, it will be appreciated that both the lower rail assembly 44 and the upper rail assembly 46 include a pair of wider, exterior plates or bars 48 and a narrower, interior bar 50. The interior bars 50 of the lower rail assembly 44 and the upper rail assembly 46 in conjunction with each pair of exterior bars 48 define grooves 52 which slidably receive the links 24 of the chain assembly 22. A plurality of threaded fasteners 54 secure the upper and lower rail assemblies 44 and 46 as well as the support plate 42 to the individual support modules 14.

As illustrated in FIG. 1, the drive module 16 also includes a semi-circular curved track portion 56 which facilitates circulation of the chain assembly 22 from one side of the assembled support modules 14 to the other. Disposed at the opposite end of the assembly machine 10 from the drive module 16 is an idle module 60 which redirects circulation of the chain assembly 22 from one side or face of the assembled support modules 14 to the other. Accordingly, it also includes a semi-circular curved track portion 62 which is in all respects like the curved track portion 56 of the drive module 16.

Turning now FIG. 3, an individual support module 14 is illustrated. The support module 14 is a generally rectangular frame which is preferably first cast and then machined. It should be appreciated at the outset that one of the significant features of the support module 14 is its highly accurate size, i.e., its squareness and surface-to-surface dimensions; and thus its interchangeability or exchangeability with other support modules 14. Hence, both the casting and the finishing undertaken upon the casting which will become the support module 14 must be of the highest dimensional accuracy. The support module 14 is preferably steel but may also be aluminum or other suitable rigid and stable material. As utilized herein, the terms "machined" and "finished" refer generally to any highly accurate process such as milling, grinding or the like which is typically used to achieve a surface with excellent planarity, dimensional accuracy and smoothness. The terms "machined" and "finished" should not, however, be construed to exclude either other currently available manufacturing processes capable of producing surfaces with such characteristics or subsequently developed or perfected manufacturing processes such as powdered metal casting capable of producing a substantially or completely finished and ready to use support module 14 having such characteristics.

As noted, the support module 14 is a rectangular frame or shell having a pair of spaced-apart top sections or panels 70 which are disposed adjacent the front and rear faces of the support module 14. The panels 70 define a respective pair of co-planar, parallel, spaced-apart machined or finished top surfaces 72 and a generally rectangular open area 74. Disposed adjacent the open area 74 and extending along the full length of the top panels 70 are pair of channels or grooves 76 each defined by a pair of opposed, overhanging lips 78 which also partially define a wider, undercut region 80. The opposed lips 78 and the undercut region 80 thus define an inverted "T" shape. The undercut region 80 receives fasteners having complementarily sized heads as will be more fully described below.

The upper front portion of the module 14 includes an upper, longitudinal, front section or panel 82 having an upper, front, planar machined or finished surface 84 and an intermediate, front, planar machined or finished surface 86 which are disposed on opposite sides of a recessed surface 88. The front machined surfaces 84 and 86 are co-planar and preferably extend the full length of the support module 14. The upper front panel 82 includes a plurality of threaded apertures 92 which receive the threaded fasteners 54 which secure the rail assemblies 44 and 46 to the support module 14.

The back face of the support module 14 is identically configured and includes an upper, longitudinal, rear section or panel 96 having an upper, rear, planar machined or finished surface 98 and an intermediate, rear, planar machined or finished surface 100 disposed on opposite sides of a recessed surface 102. The rear machined surfaces 98 and 100 are co-planar and preferably extend the full length of the support module 14. The upper rear panel also preferably includes a plurality of threaded apertures 92. The upper front panel 82 and the upper rear panel 96 are strengthened and stabilized by a pair of triangular webs or gussets 104 which extend between each of the top panels 72 and the adjacent upper front panel 82 and the upper rear panel 96. Only the gusset 104 associated with the upper rear panel 96 is illustrated in FIG. 3.

The ends of the support module 14 are also identically configured and thus only the forward end visible in FIG. 3 will be described, it being understood that the rear (hidden) end is configured identically. Each of the upper ends of the support module 14 include an upper, transverse section or panel 110 having an upper, transverse, planar machined or finished surface 112. Formed in the upper transverse panel 110 by any suitable manufacturing or machining process such as cutting, milling or grinding is a first horizontal transverse slot or channel 114 and a vertical, intersecting slot or channel 116 which is preferably disposed precisely in the middle of the transverse panel 110. Also formed in the upper transverse panel 110 are a plurality of through apertures 118.

The vertically medial portion of the support module 14 is defined by four vertically oriented stanchions or posts 120 disposed generally in the vertical corners of the support module 14 which connect the upper sections 82, 96 and 110 with corresponding lower sections. The lower ends of the support module 14 include lower, transverse sections or panels 122 having lower, transverse, planar, machined or finished surfaces 124 which are co-planar with the upper, transverse machined surfaces 112 of the upper transverse panels 110. Disposed at the transverse midpoint of each of the transverse panels 122 is a vertical slot or channel 126 which is preferably aligned with the vertical channel 116 formed in the upper transverse panels 110. An array or plurality of through apertures 128 are also formed in the lower transverse panels 122. The upper transverse panels 110, the posts 120 and the lower transverse panels 122 define generally rectangular openings 130 in the ends of the support module 14. It should be understood that the upper, transverse machined surfaces 112 and the lower, transverse machined surfaces 124 at each end of the support module 14 are co-planar and that such planes are parallel to one another.

The lower region of the support module 14 also includes a lower, front section or panel 132 having a lower, front, planar machined or finished surface 134 which is co-planar with the upper, front machined surfaces 84 and 86. The lower front panel 132 preferably extends the full length of the support module 14. A complementarily configured lower rear section or panel 136 includes a lower, rear, planar machined or finished surface 138 which is co-planar with the upper rear machined surfaces 98 and 100. The lower rear section or panel 136 likewise preferably extends the full length of the support module 14. It should also be understood that the plane defined by or containing the front, planar machined surfaces 84, 86 and 134 and the plane defined by or containing the rear, planar machined surfaces 98, 100 and 138 are parallel. Finally, it should be understood that the front machined surfaces 84, 86 and 134 and the rear machined surfaces are perpendicular to the top machined surfaces 72 and the transverse machined surfaces 112 and 134.

Figure 4:
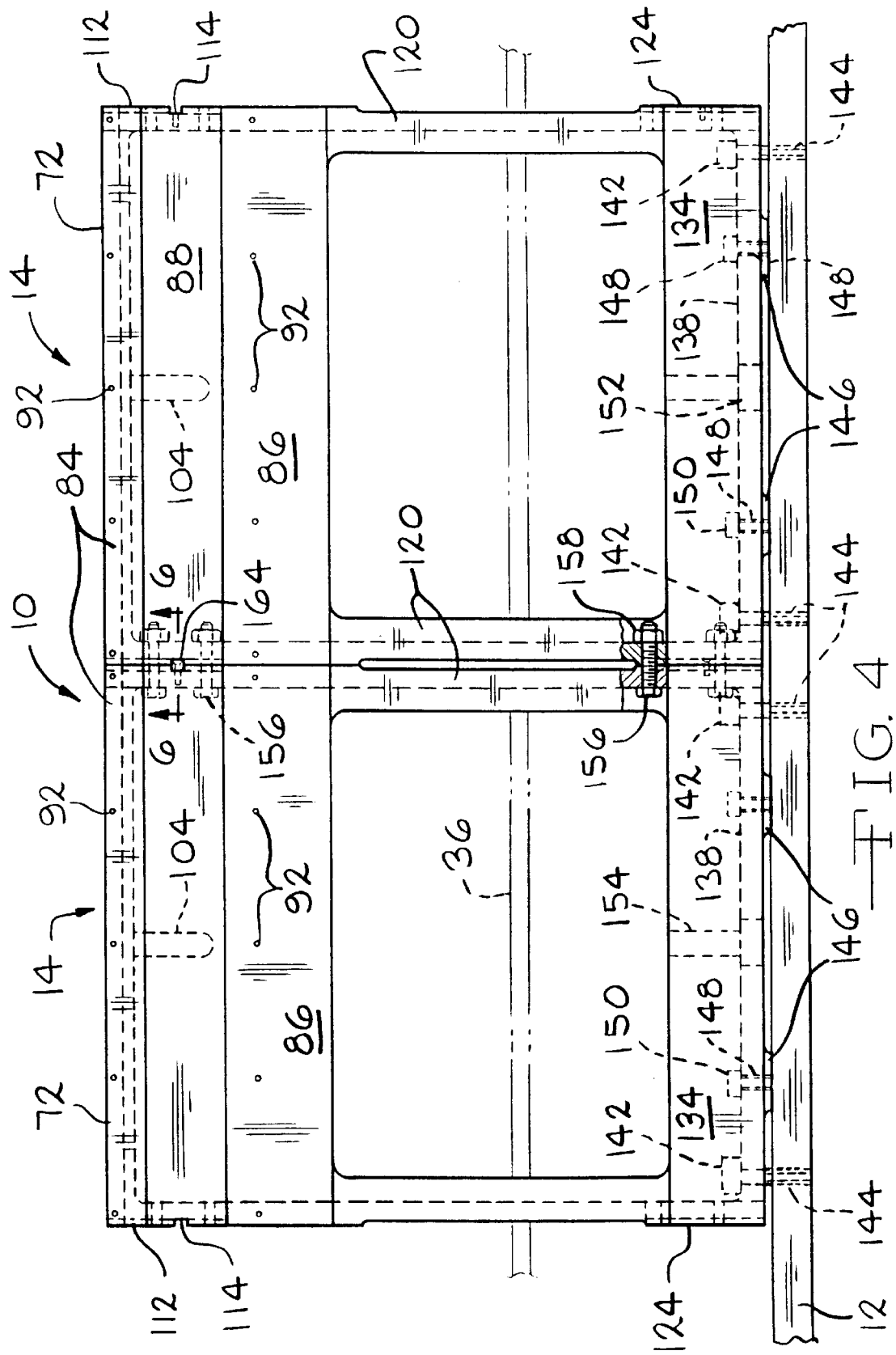
FIG. 4 is a front, elevational view of a pair of adjacent modular supports with a portion broken away of a reconfigurable assembly machine according to the present invention.

Referring now to FIGS. 3 and 4, a pair of longitudinally extending bottom sections or panels 140 (one of which is illustrated in FIG. 3) merge with the adjacent front, lower panel 132 or rear, lower panel 136 and preferably extend longitudinally the full length of the support module 14. A plurality of threaded fasteners 142 such as cap screws extend through the bottom panels 140 and are received within complementarily threaded openings 144 in the mounting plate 12 to secure the support modules 14 thereto. A plurality of shallow bosses or projections 146 extend from the lower surface of the bottom panels 140 and surround a like plurality of threaded apertures 148 which receive complementarily threaded leveling bolts 150. The leveling bolts 150 may be adjusted to raise, lower or stabilize the adjacent region of the support module 14 if such adjustment is necessary. The bottom panels 140 are joined in the middle by a transverse beam 152. A pair of triangular webs or gussets 154 extend from the bottom panels 140 and the transverse beam 152 to a respective one of the lower panels 132 and 136.

As illustrated in FIGS. 4 and 6, a pair of the support modules 14 are secured together and are representative of a portion of a reconfigurable assembly machine 10. As noted above, the pair of support modules 14 are secured to the mounting plate 12 by a plurality of threaded fasteners 142 which are received within complementarily threaded apertures 144 in the support plate 12. The support modules 14 are rigidly interconnected by a plurality of threaded fasteners such as the machine bolts 156 and complementarily configured nuts 158 which pass through the apertures 118 and 128 in the juxtaposed upper and lower transverse panels 110 and 122, respectively.

Referring now to FIGS. 4, 5, 6 and 7, further details of the registration and securement of the adjacent support modules 14 are presented. When the support modules 14 are juxtaposed as illustrated in FIG. 4, the channels 114, 116 and 126 in the upper and lower transverse panels 110 and 122, respectively, precisely align. On one end of each of the support modules 14 in the three channels 114, 116 and 126 are disposed respective registration bars or rails 164, 166A, 166B and 168. The registration rails 164, 166A, 166B and 168 are just slightly narrower in width than the width of the channels 114, 116 and 126 and just slightly less than twice the depth of the channels 114, 116 and 126 such that, as illustrated in FIG. 6, one half of each of the registration rails, such as the registration rail 164, resides in each of the adjacent channels, such as the channels 114, of an adjacent pair of support modules 14.

The registration rails 164, 166A, 166B and 168 are retained within the respective channels 114, 116 and 126 by a plurality of threaded fasteners 172 which extend through chamfered apertures 174 in the rails 164, 166A, 166B and 168 and are received within blind threaded bores 176 in the transverse panels 110 and 122. It will be appreciated that the blind threaded bores 176 as well as the registration rails 164, 166A, 166B and 168 must be and are disposed only on one end of each of the support modules 14. When the support modules 14 are juxtaposed, the registration rails 164, 166A, 166B and 168 precisely align and position one support module 14 relative to an adjacent support module 14. For reasons of flexibility and ease (similarity) of manufacture, however, the blind threaded bores 176 may be disposed on both ends of each support module 14. It should be understood that the drive module 16 and the idle module 60 include complementarily configured and suitably located channels, rails and apertures so that the support modules 14 disposed thereadjacent may be assembled and secured in a similar manner.

FIG. 8 presents a typical work station or assembly module 180 of a reconfigurable assembly machine 10. The assembly module 180 includes at least one support module 14 which may be secured to the elongate mounting plate 12 by fasteners 154. A portion of the chain assembly 22 is illustrated on the side of a support module 14 and an individual link 24 of the chain assembly 22 is illustrated which includes one of a plurality of jigs or fixtures 182 secured thereto which receives a part, component or assembly (not illustrated) to be assembled, machined, drilled, completed or otherwise affected by the assembly module 180. As described above, the links 24 of the chain assembly 22 circulate within a track assembly 40 comprising the lower rail 44 and upper rail 46. Typically the links 24 and the associated jig and fixture 182 move intermittently and circulate about the assembly machine 10 as described above and illustrated in FIG. 1.

Secured to the top surfaces 72 of the support module 14 is a machining or processing assembly such as, for example, a drill press 184. It should be understood that the drill press 184 is exemplary and illustrative only and that myriad assembling, machining, installing, securing, welding, soldering, gluing, fastening, grinding, finishing, polishing, evacuating, charging and testing devices will typically be utilized and juxtaposed on the support modules 14 of the reconfigurable assembly machine 10. The drill press assembly 184 includes a vertical stanchion 186 and a flat mounting plate 188 having suitably arranged apertures which receive the shanks of threaded fasteners 190 having enlarged heads 192 with flats spaced apart a distance which is slightly smaller than the width of the undercut regions 80 such that the threaded fasteners 190 are incapable of rotation but may be conveniently slid along the length of the undercut regions 80 to accommodate and securely mount various devices such as the drill press 184. Complementarily threaded nuts 194 disposed on the fasteners 190 may be tightened or loosened to secure or adjust or remove the drill press 184 or other assembly device. The output shaft 36 extends through the support module 14 within the openings 130 and may include a chain sprocket 196 and drive chain 198 which drives cams, switches, valves and related operators (all not illustrated) to facilitate and achieve the manufacturing and assembly desiderata of the work station or assembly module 180.

If, for example, the work station or assembly module 180 secured to the support module 14 illustrated in FIG. 8 is no longer needed in a given reconfigurable assembly machine 10, or it is in need of repair or reconstruction, it may be readily removed without significantly disturbing the remaining support modules 14 and associated assembly equipment or interfering with production. Although the order of disassembly is not critical, it is convenient to first disconnect the output shaft 36 and remove the drive chain 198 from the work station or assembly module 180. Next, the machine bolts 156 extending between all of the adjacent support modules 14 are disassembled from the nuts 158 and removed. Lastly, the threaded fasteners 142 which secure the support module 14 to the mounting plate 12 are removed. With the proviso that the adjacent support modules 14 may need to be partially disassembled and temporarily moved in order that the registration rails 164, 166A, 166B and 168 may clear the adjacent support modules 14 when the unneeded support module 14 is removed, the unneeded support module 14 may now be removed from the reconfigurable assembly machine 10. With the unneeded support module 14 removed, the remaining support modules 14 may be realigned and resecured to the mounting plate 12 and each other and the output shaft 36 may be reconnected. The reconfigurable assembly machine 10 may now be utilized without the unneeded support module 14 and such support module 14 may, for example, be stored, repaired or rebuilt.

The foregoing description relates to a reconfigurable assembly machine 10 wherein the support modules 14 are arranged linearly and back-to-back as illustrated in FIG. 1. In such an arrangement, the work stations or assembly modules 180 such as illustrated in FIG. 8 may be, and typically will be, disposed upon both the front and rear rows of support modules 14 of the assembly machine 10. However, and as noted above, since the front and rear longitudinal faces of the support modules 14 are identically configured, they may be utilized in a single row or line wherein the chain assembly 22 translates along a track assembly 40 secured to the front face of the support modules 14 and translates in the opposite direction along a track assembly 40 secured to the back or rear face of the same support modules 14. In such a installation, the curved track portions 56 and 62 of the drive module 16 and the idle module 60, respectively, will preferably have a reduced width such that the reversal of the chain direction occurs in a transverse distance corresponding to the separation of the track assemblies 40 on the front and rear faces of the single row of support modules 14. Also in such an installation, all the work stations or assembly modules 180 may be located to face or address the same, i.e., front or rear, faces of the support modules 14 or the work stations or assembly modules 180 may be arranged such that some face the front and some face the rear, as desired.

It should be appreciated that the support modules 14 and the reconfigurable assembly machine 10 of the present invention may be and is adapted for use in both synchronous and asynchronous assembly machine applications. That is, in an assembly machine 10 according to the present invention, rotation of the chain assembly 22 and assembly steps performed by the various work station or assembly modules 180 on the parts or components disposed in the various fixtures 182 may be achieved synchronously, i.e., in timed relation to one another or asynchronously, i.e., independently of one another.

The foregoing disclosure is the best mode devised by the inventor for practicing this invention. It is apparent, however, that apparatus incorporating modifications and variations will be obvious to one skilled in the art of assembly machines. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A module for a reconfigurable assembly machine comprising, in combination,
   a top panel having a channel defined by opposed overhanging lips,
   a pair of front and rear longitudinal panels, at least one of said longitudinal panels having openings for receiving fasteners,
   a pair of first transverse panels adjacent said longitudinal panels, each of said transverse panels including channels adapted to receive registration members,
   a pair of second transverse panels spaced from said first transverse panel, each of said second transverse panels including a channel adapted to receive a registration member.

2. The module of claim 1 wherein said top panel, said longitudinal panels, said first transverse panels and said second transverse panels include planar surfaces.

3. The module of claim 1 further including openings in said top panel and between said pair of first transverse panels and said pair of second transverse panels adapted to receive drive members.

4. The module of claim 1 further including a plurality of said modules arranged in back-to-back pairs and wherein said back-to-back pairs are disposed in a linear arrangement.

5. The module of claim 1 wherein one of said pair of first transverse panels includes projecting registration members disposed in said channels.

6. The module of claim 1 further including corner members connecting said first transverse panels and said second transverse panels.

7. The module of claim 1 further including a track assembly including an upper rail assembly defining a first groove and a lower rail assembly defining a second groove, said first and said second grooves adapted to cooperatively receive a plurality of interconnected chain links.

8. A support module for a reconfigurable assembly machine comprising, in combination, a top panel having at least one channel defined by a pair of opposed, overhanging lips, a pair of first longitudinal panels having a plurality of openings for receiving fasteners, a pair of first transverse panels extending between said first longitudinal panels, one of said pair of transverse panels including projecting registration rails and another of said pair of first transverse panels including channels adapted to receive registration rails, a pair of second longitudinal panels spaced from said first longitudinal panels, a pair of second transverse panels extending between said second longitudinal panels, one of said pair of second transverse panels including a projecting registration rail and another of said pair of second transverse panels including a channel adapted to receive a registration rail, corner members connecting said first longitudinal panels and said first transverse panels with said second longitudinal panels and said second transverse panels.

9. The support module for a reconfigurable assembly machine of claim 8 further including a track assembly including an upper rail assembly defining a first groove and a lower rail assembly defining a second groove, said first and said second grooves adapted to cooperatively receive interconnected chain links.

10. The support module for a reconfigurable assembly machine of claim 8 wherein said top panels, said first longitudinal panels, said first transverse panels and said second transverse panels include planar surfaces.

11. The support module for a reconfigurable assembly machine of claim 8 further including a plurality of said modules arranged in back-to-back pairs and wherein said back-to-back pairs are disposed in a linear arrangement.

12. A module for a reconfigurable assembly machine comprising, in combination, at least one top panel defining at least one channel having overhanging, opposed lips defining a throat, a pair of side panels, at least one of said side panels having a plurality of openings for receiving fasteners, a pair of upper end panels extending between said side panels, each of said end panels including a pair of intersecting channels adapted to receive registration members, and a pair of lower end panels, each of said lower end panels including a channel adapted to receive a registration member.

13. The reconfigurable assembly machine module of claim 12 wherein said top panel, said side panels, said upper end panels and said lower end panels include planar surfaces.

14. The module of claim 12 wherein said at least one channel is adapted to slidably and non-rotatably receive a fastener head.

15. The module of claim 12 wherein one of said pair of upper end panels includes projecting registration members disposed in said intersecting channels.

16. The reconfigurable assembly machine module of claim 12 further including an opening between said one of pair of upper end panels and a respective one of said pair of lower end panels adapted to receive a drive member.

17. The reconfigurable assembly machine module of claim 12 wherein said pair of upper end panels and said pair of lower end panels include apertures adapted to receive fasteners.

18. The reconfigurable assembly machine module of claim 12 further including a plurality of said rectangular frame modules assembled in a linear arrangement.

19. The reconfigurable assembly machine module of claim 12 further including a plurality of said modules arranged in back-to-back pairs and said back-to-back pairs are disposed in a linear arrangement.

20. The reconfigurable assembly machine module of claim 12 further including a track assembly including an upper rail assembly defining a first groove and a lower rail assembly defining a second groove, said first and said second groove adapted to cooperatively receive a plurality of interconnected chain links.

* * * * *